United States Patent [19]

Selin

[11] Patent Number: 4,730,918

[45] Date of Patent: Mar. 15, 1988

[54] AUTOMATIC PRINTING MACHINE FOR PRINTING TEXT ON CINEMATOGRAPHIC FILM

[75] Inventor: Björn Selin, Solna, Sweden

[73] Assignee: AB Film-Teknik, Solna, Sweden

[21] Appl. No.: 930,179

[22] PCT Filed: Feb. 17, 1986

[86] PCT No.: PCT/SE86/00066

§ 371 Date: Oct. 22, 1986

§ 102(e) Date: Oct. 22, 1986

[87] PCT Pub. No.: WO86/05004

PCT Pub. Date: Aug. 28, 1986

[30] Foreign Application Priority Data

Feb. 22, 1985 [SE] Sweden .............................. 8500882

[51] Int. Cl.[4] .............................................. G03B 21/32
[52] U.S. Cl. .............................................. 352/90
[58] Field of Search .......................................... 352/90

[56] References Cited

U.S. PATENT DOCUMENTS

| | | | |
|---|---|---|---|
| 2,051,603 | 8/1936 | Hruska | 352/90 |
| 3,661,579 | 5/1972 | Vrancken et al. | 352/90 |

FOREIGN PATENT DOCUMENTS

| | | | |
|---|---|---|---|
| 2205404 | 9/1972 | Fed. Rep. of Germany | 352/90 |
| 2036369 | 6/1980 | United Kingdom | 352/90 |

*Primary Examiner*—Monroe H. Hayes
*Attorney, Agent, or Firm*—Pollock, VandeSande & Priddy

[57] ABSTRACT

An automatic printing machine for printing text on film has a main shaft (40) which is provided with an eccentric operative in driving a pressure-plate supporting slide via a knee joint which can be straightened/out by a rotary magnet (41). Arranged on the opposite side of the film path is an open bracket structure (30), on which a counter-pressure plate (30) is mounted. The pressure exerted by the counter-pressure plate can be varied with the aid of a force source which is independent of the bracket structure (30), and consequently the bracket structure does not need to take-up the counter-pressure exerted by the counter-pressure plate and is not subjected to said pressure.

2 Claims, 9 Drawing Figures

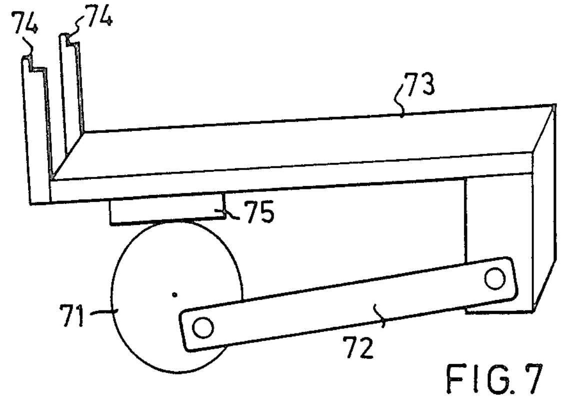
FIG. 7
FIG. 8
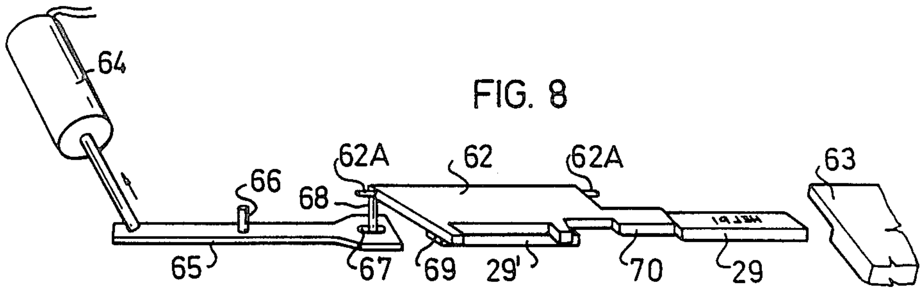

AUTOMATIC PRINTING MACHINE FOR PRINTING TEXT ON CINEMATOGRAPHIC FILM

FIELD OF THE INVENTION

The invention relates to an automatic printing machine.

BACKGROUND OF THE INVENTION

A method of applying text with the aid of printing methods to cinematographic film where the language spoken on the film sound-track is different from the native tongue of the audience was devised more than fifty years ago. Normally, such text cannot be applied photographically, since only finished copies of the film are made available for export by the film company concerned, and not the negative. As evidenced by, for example, Norweigan Pat. Nos. 85 523; 93 143; 93 144; 94 660; 99 749 and 108 989, and Swedish Pat. Nos. 82,146; 84,499; 87,870; 92,700 and 334,538, such methods have long been known to the art. In present day methods the text is applied by covering the emulsion with a layer of wax which is brought into penetrating engagement with a printing block or plate provided with raised alphabetical letters, such as to expose the emulsion partially, whereafter the exposed emulsion is dissolved and removed and finally the wax is washed-off.

In known printing machines of the kind in question (e.g., Fr-A-2 239 708), the film is drawn forwards with the aid of a conventional feed arrangement, which includes a gripping mechanism, in a manner such that each frame of the film remains stationary for a given length of time in a printing station in which a printing block is pressed from beneath into engagement with the wax-coated layer of emulsion by means of a pressure plate which is coupled cinematographically with the gripping mechanism. A stationary counter-pressure plate is arranged in a bridge extending across the printing station. The pressure must be varied in accordance with the length of the text to be printed. For example, if the text "Help!" is printed with the same force as that applied when printing the words "my dear girl, you are wolfing your food", the film would be perforated as a result thereof. Consequently, the pressure plate is provided mechanically with a strong spring or a pneumatic device which can be adjusted to varying degrees of tension. In addition to making the machine complicated, it is difficult to achieve controllability for large and small pressure forces with one and the same spring. It should be possible to vary the counter-pressure within a range of, for example, 20–700 N. The operator has in front of him a manuscript on which he has noted the value of the counter-pressure required. When changing text, the operator operates a slide means, with which he permits a fresh printing block or plate to displace the preceding block from the printing station and to take its place. Known printing machines of this kind comprise in this order, a reel holder, a first wax-applicator for applying wax to the surface of the film frames, the printing machine, a second wax-applicator for applying wax to the perforated frame-edges (which cannot be waxed until the gripping machine has completed its function), an etching bath, a rinsing bath, a first drying section, two successive washing baths containing a wax-dissolving substance, a second drying station, and a winding-up device for winding-up the treated film. Although such prior art machines are constructed rationally for continuous operation, it still takes from five to six hours to provide a feature film with text, sub-titles, even when using the best apparatus known.

OBJECT OF THE INVENTION

The object of the invention is to provide an automatic printer of the aforesaid kind which will operate more rapidly, more reliably, and more automatically than said known printers, and which is suited for automatically controlling, inter alia, frame changes and adjustment of the counter-pressure, e.g., with the aid of a data-processor.

Another object is to obtain a reliable feed mechanism for the printing blocks. In known apparatus, it is normal to exchange a printing block for the next by letting the latter push the former out from the print position. If this fails, a printing block may fall out and bring the printing into disorder. This may lead to the ruining of an expensive film copy if not immediately observed by the operator.

For the arrangement of a practical feed system, it is desirable to eliminate the aforementioned bridge which extends across the path of the film and on which the counter-plate was previously mounted, as shown in the abovementioned publication. This bridge presents a serious obstacle with regard to attaining a rational solution to the problem of changing small printing blocks one for the other rapidly and reliably (these blocks normally measure 23×4×2 mm). Accordingly, the bridge, which extends transversally to the film path and is attached at both sides to the supporting structure, has been replaced with a bracket structure which is located above the film path and in which the counter-pressure plate is mounted in a guided, slidable fashion, with the possibility of varying the counter-pressure. The large pressure forces, which are applied thrustingly, will, however, draw the bracket structure, and therewith the counter-pressure plate, to an inclined position; one is concerned here with forces as high as 700 N, in conjunction with small tolerances. In order to overcome this problem, the pressure plate should be pressed against the film by means of a variable pressure-generator which is independent of the bracket structure. The bracket structure thus merely guides the pressure plate and does not take-up the counter-pressure. As a result of eliminating the bridge, there is then presented between the printing-block position and the counter-pressure plate a space which can be reached from one side of the film in a direction transversally thereto, thereby enabling the installation of an automatically operating and reliable printing-block exchange mechanism, such as provided by the present invention.

BRIEF DESCRIPTION OF THE DRAWINGS

The invention will now be described in more detail with reference to an exemplary embodiment thereof reproduced in the accompanying drawings.

FIG. 7 illustrates a gripping mechanism.

FIG. 8 illustrates schematically part of a printing-block changing arrangement.

DESCRIPTION OF PREFERRED EMBODIMENT

Figure 1:
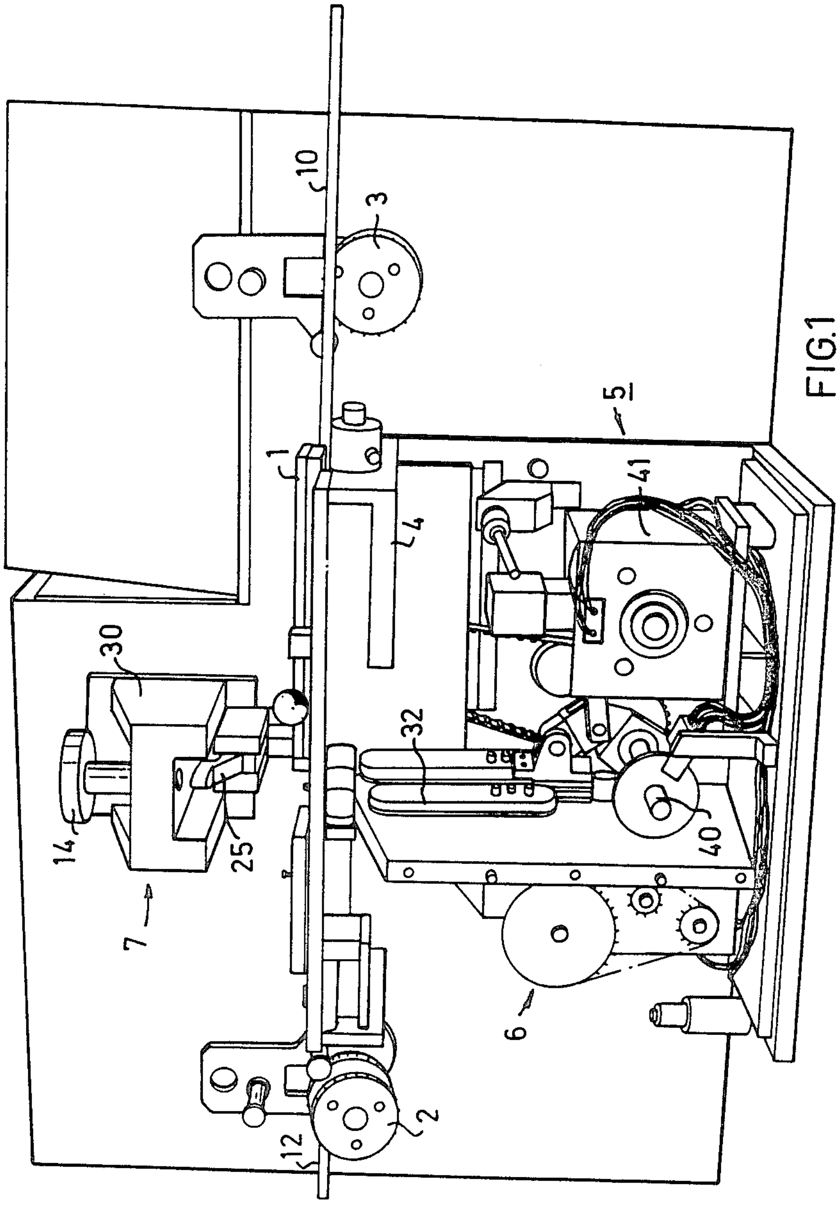
FIG. 1 is a front view of a partially dismantled automatic printing machine.
Figure 2:
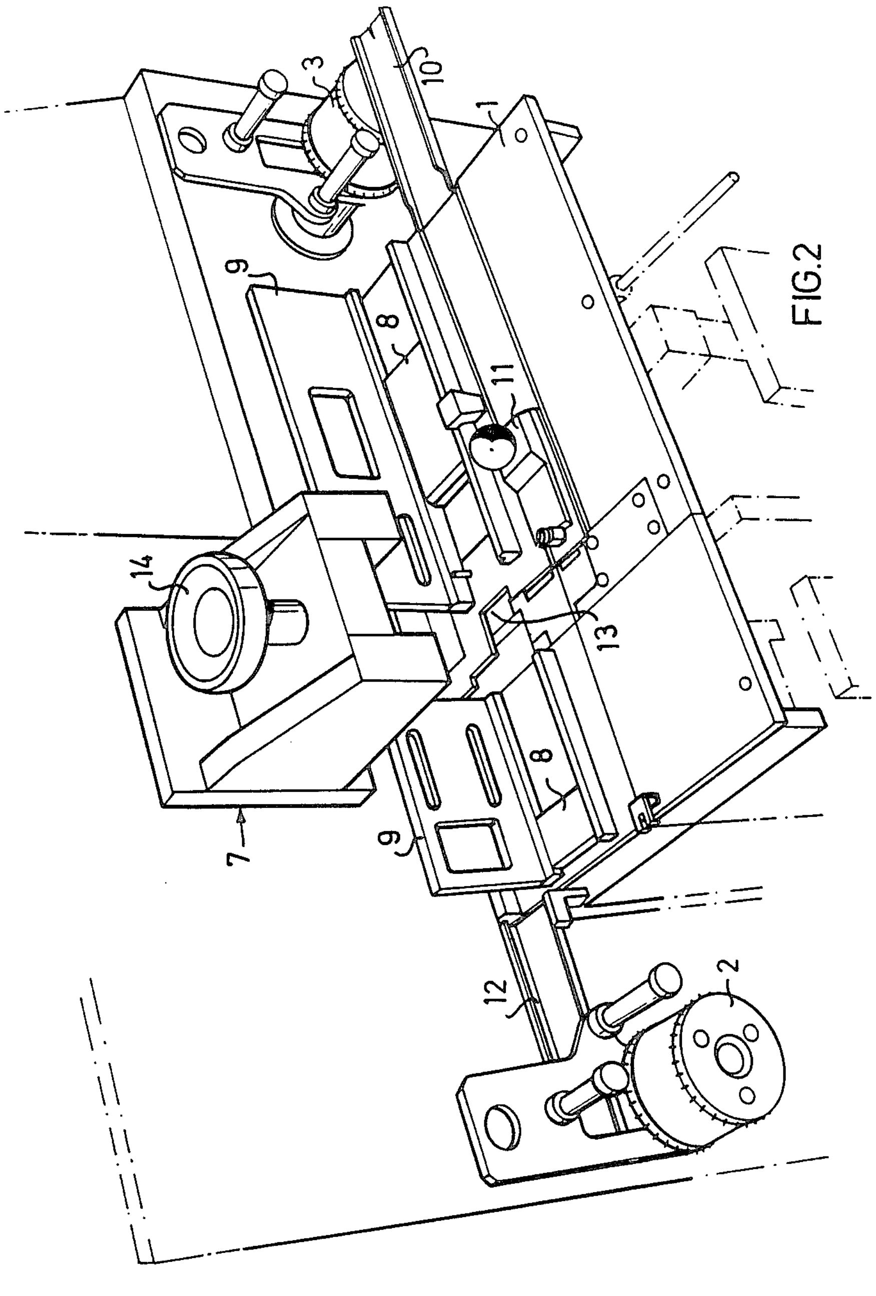
FIG. 2 is a view of the machine illustrated in FIG. 1 taken obliquely from above.

A total view of one embodiment of the invention is given by FIGS. 1 and 2, in which the illustrated apparatus have been relieved of their respective obstructing and, to a certain extent, load-carrying walls. Mounted in a machine frame is a plate 1 in which a film transport path extends between two feed wheels 2 and 3. Located between the feedwheels 2 and 3 and the plate 1 is a space in which the film can be laid in loops, since whereas the film is advanced intermittently over the plate 1, it is fed continuously by the feed wheels 2 and 3. Beneath the plate 1 there are located a gripping mechanism 4; a printing unit 5, which incorporates a vertically movable pressure plate; and a printing block feed unit 6. Located above the plate 1 is a counter-pressure arrangement 7, which is partially dismantled in the illustration in FIGS. 1 and 2.

The film path 8 is best seen in FIG. 2 and extends partially beneath a pivotable cover on lid 9, which is shown in a raised position in this figure. Also arranged on the plate 1 is a first transport path or chute 10 for the advancement of a row of printing blocks, which are advanced by a pusher 11 drawn by means of a pulley weight and shown in FIG. 2 in one terminal position at which the chute is empty. Arranged on the opposite edge side of the film path 8 is a second transport path or chute 12, which receives the used printing blocks fed from the printing-block position 13 located beneath the film path 8.

Figure 6:
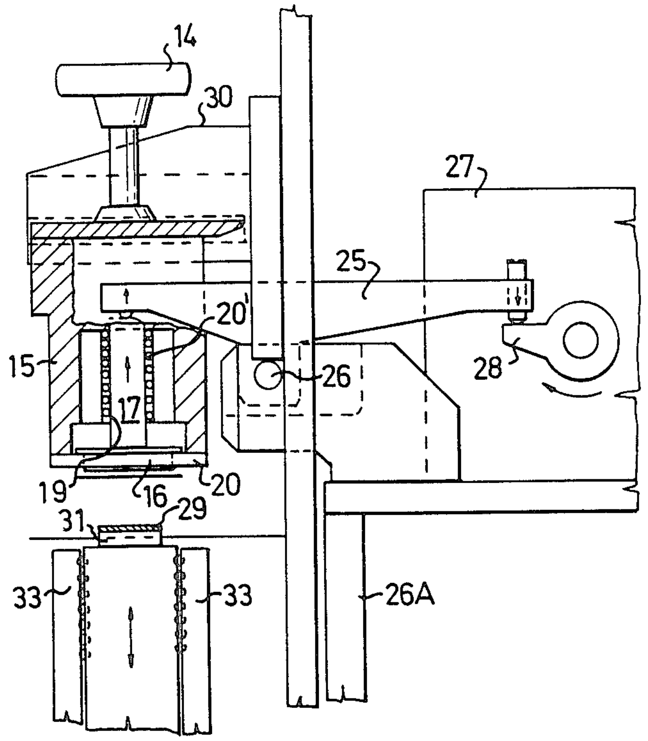
FIG. 6 is a sectional view of the counter-pressure plate and the means for generating a counter-pressure.

An important characteristic feature of the invention resides in the counter-pressure arrangement shown in a partially dismantled state in FIGS. 1 and 2. These figures show only one bracket structure 30 attached to a vertical wall incorporated in the machine frame and functioning as a stanchion or upright, the bracket structure 30 being provided with a wheel or knob 14 for firmly screwing a counter-pressure unit 15, shown in cross-section in FIG. 6. A counter-pressure plate 16 provided with a stem 17 is mounted on the bracket structure 30 normally firmly screwed into the unit 7 (FIGS. 1 and 2). The stem 17 is mounted in the aperture 19 and the actual pressure plate 16 is accommodated in a rectangular opening and held against falling therefrom by means of a perforated plate 20 attached to the unit 15. The perforated plate is clad with film-protecting velvet along two edges thereof. The stem 17 is journalled in a ball-and-socket joint 20 and the pressure plate 16 is urged outwards by means of a weak thrust spring (not shown). In accordance with the invention, the counter-pressure unit 15 its counterpressure so that the bracket structure 30 is not loaded by the applied counter-pressure to any appreciable extent. This effect is achieved in the illustrated embodiment by subjecting the end of the stem 17 to load in its axial direction by one end of a lever arm 25 (which is shown projecting outwards in FIG. 1). The arm 25 can be swung about a shaft 26 which is secured in the machine frame to a separate support device 26A independent of the machine-frame wall which supports the bracket structure 30. Arranged at the opposite end of the carrier arm 25 is a rotary magnet 27 (e.g., type E9 from the German company KUHNKE) having a crank 28 against which said opposite end of the lever arm rests, as shown in FIG. 6. This enables the counter-pressure exerted by the counterpressure plate 16 to be varied between 0 and 70 kg, depending upon the current supply to the rotary magnet 27.

Figure 9:
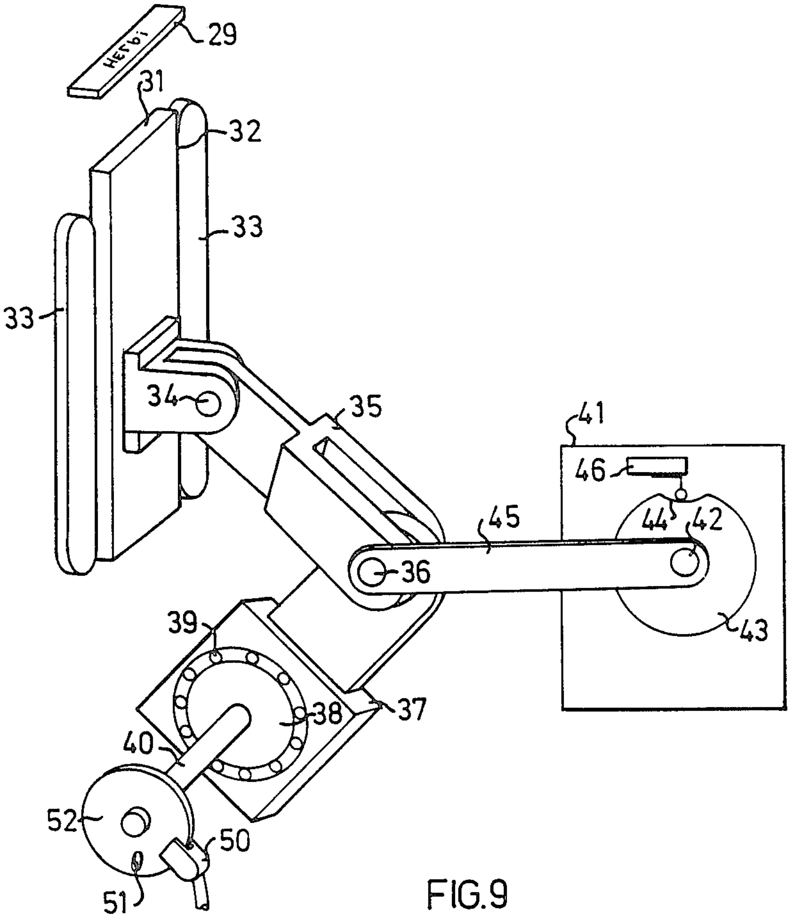
FIG. 9 illustrates schematically an auxiliary mechanism for operating a printing plate.

The actual application of text to the film is effected through a printing unit 5 shown in FIG. 1 and illustrated schematically in FIG. 9. In the act of printing, a printing block 29 located in its printing position 13 is pressed upwards against the counter-pressure plate 16 (FIG. 6) with the film in the film path 8 located between the plate 16 and the block 29, with the side of the film coated with a waxed layer of emulsion facing downwards. The print is applied by lifting the pressure plate 31, on which the printing block 29 is seated, at 13 in FIG. 2, in a fixed printing position (not shown), said pressure plate being lifted at the same time as the counter-pressure plate 16 obtains counter-pressure as a result of supplying current to the rotational magnet 27 (FIG. 6). The pressure plate with the printing block seated thereon can be raised and lowered in time with the intermittent feed, the film, effected through a coupled drive from the main shaft 40 at a speed of one film frame for each revolution of the main shaft 40. Seated on the main shaft 40 is an eccentric disc 38 which is provided with an eccentric ball bearing 39 in which there is journalled one end of a first link 37, the other end of which is journalled on a second link 35, via a knee joint 36, said second link in turn being journalled to the slide 32 incorporated in the ball-slide device 33. As will be seen instantly from FIG. 9, in the position illustrated therein the eccentric motion will primarily result solely in pivotal movement in the knee joint 36, while the pivot point 34 remains stationary. By actuating the rotary magnet 41, however, so that its crank 42 is swung through 50 degrees, it is possible with the aid of the link 45 to move the knee joint 36 to the left in the figure and to "straighten-out" the knee. It is also possible to provide stop means for preventing further rotation of the "knee joint" and to effect self-locking, and in the position thus obtained the eccentric movement will act directly on the slide 32 and cause the pressure plate to move up and down to execute a pressure movement against the printing block 29.

The main shaft 40 is coupled to a gripping mechanism, illustrated schematically in FIG. 7, via a toothed belt (not shown). The mechanism illustrated therein is seated on a horizontally slidable slide (not shown) which enables the stop position of the film frames to be adjusted in relation to the position of the printing block and therewith to the positioning at the text on respective film frames. The toothed belt drives the cam wheel 71 at a transmission ratio of 1:1, said wheel 71 driving the link 72, and therewith the gripping device 73 backwards and forwards, via a crank. The gripping device 73 is provided on its undersurface with an anti-friction coating 75 and rests against the cam wheel 79, and consequently both gripping claws 74 of the gripping device 73 mating with the perforations on the film are lifted into engagement with the film in one direction of movement and lowered out of engagement with the film in another direction of movement. The length stroke corresponds to the span of four perforations in a standard film, i.e., the span of one film frame. The aforementioned toothed belt is set so that printing takes place during that half of the stroke within which the film is immovable.

The printing operation is initiated by straightening the knee joint 36 (FIG. 9) by means of the rotary magnet 41. Provided on the cam disc 43 of the magnet 41 is a notch 44 which, in the illustrated inactivated position, is sensed by the microswitch 46. The shaft 40 rotates constantly, and consequenty it is important that the magnet 41 be activated at a position in which the eccentric has a low position, which is detected with the aid of a perforated disc 52 provided with an aperture 51 and attached to the main shaft 40, the aperture 51 being sensed by the light fork 50. This activation is suitably effected by firstly applying a strong current to the magnet 41, followed by a holding current sufficient to guarantee that the knee joint is held straight.

We now arrive at the aforementioned change of printing blocks, which cannot take place, of course, when the printing mechanism is activated. This state is detected by the microswitch 46 (FIG. 9).

Figure 4:
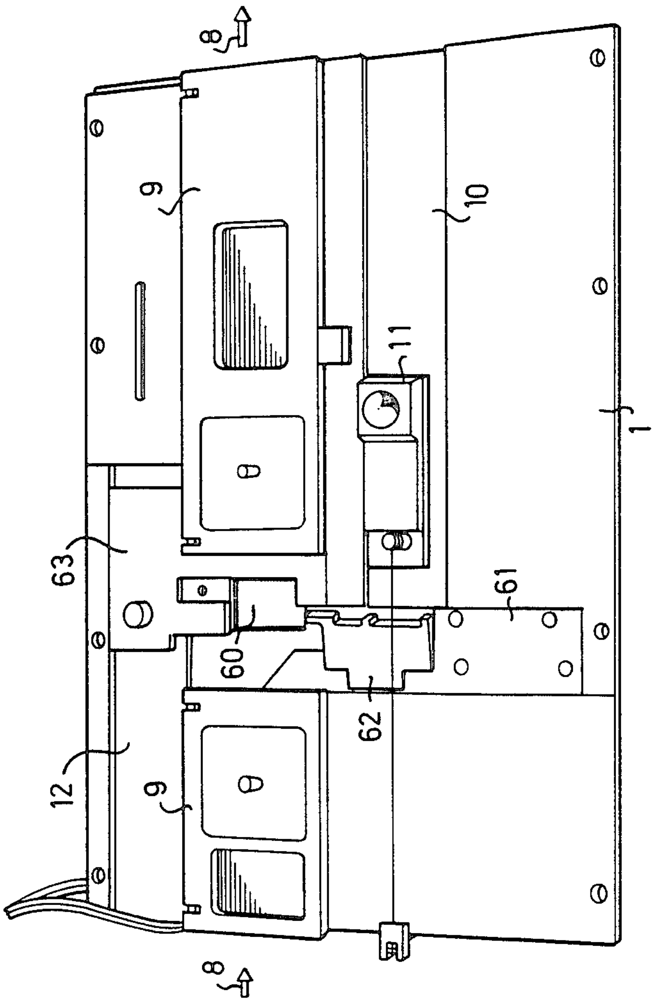
FIG. 4 is a view of a plate incorporated in the printing machine, and lying in the plane of the film.
Figure 5:
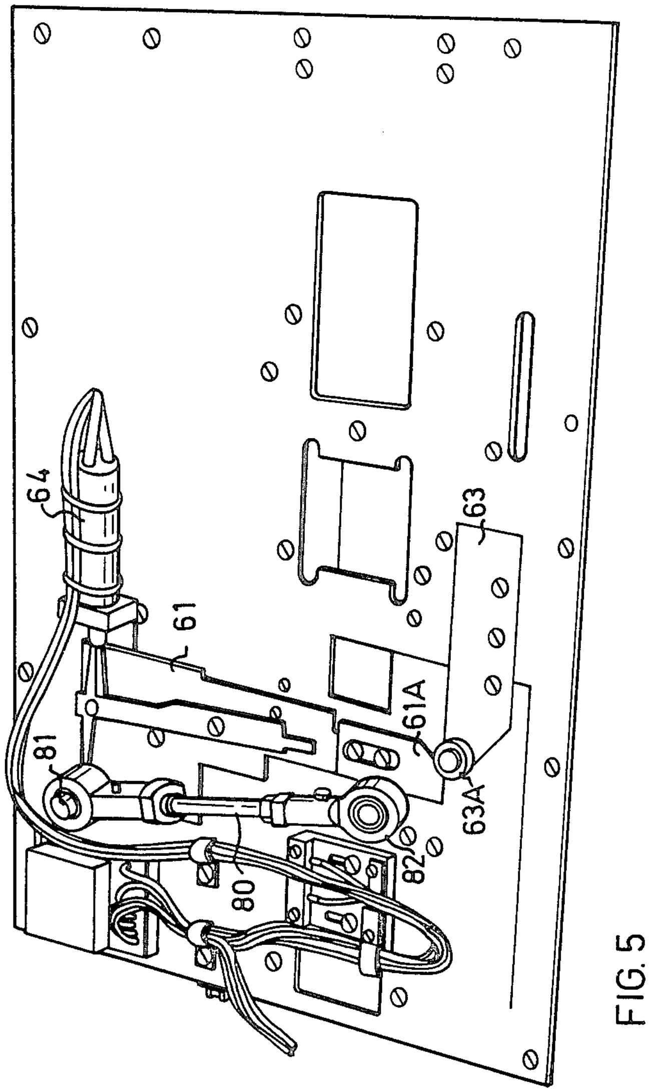
FIG. 5 is a bottom view of the plate in FIG. 4.

FIG. 4 shows the uncovered plate 1, where the film path 8 passes beneath the cover plates 9, which are shown in their lowered positions. Printing blocks are changed, one for the other, by urging a printing block from the path 10 to the printing-block position above the opening 60, through which the pressure plate is lifted in accordance with what has previously been described. At the same time, the preceding printing block present in the printing-block position is transferred to the path 12. This change of printing blocks is effected with the aid of a slide 61, which is moved backwards and forwards in a direction at right angles to the film path 8. This mechanism can be seen in FIG. 5, compared with the detail view in FIG. 8. The slide 61 has on the upper side of the plate 1 (FIG. 4) a pivotable flap 62, as best seen in FIG. 8. When the slide is to be driven forward, the flap 62 is dropped with the aid of a pulling magnet 64, mounted on the underside of the slide, via a pivot arm 65, journalled at 66, a fork 67, and an operating arm 68 attached to the flap 62. The pivot arm 65 is loaded by a spring (not shown) which holds the flap 62 in a slightly raised position. When the flap is lowered, it covers the first printing block 29' in the path 10. The flap is provided with a tooth 70. When the slide is moved to the right in FIG. 8, a part of the slide (not shown in FIG. 8), through the activation of its one end 69, dogs the printing block 29' at the same time as the printing block 29 located in the printing-block position, is displaced to the right by the tooth 70, towards the path 12. It will be noted that the printing block 29 is covered by the counter-pressure plate 16 when the whole is in function, thereby preventing the printing blocks from turning onto their respective edges. In order to avoid this from happening subsequent to the printing block 29 having left the printing-block position, a roofed slide 63 is mounted in the receiving path 12 and is retracted so as to afford room beneath its roof for the printing block displaced by the tooth 70. As will be seen from the underneath view of FIG. 5, this is effected as a result of the activation of a roller 63A, mounted on the slide 63, by a bevelled surface 61A on the slide 61, thereby to couple the movements of the slides. As a result of the arrangement of these components, the printing blocks are maneuvered in a manner which minimizes the chances of the printing block becoming jammed, thus making automatic operation possible and enabling the used printing blocks to be kept in the correct order when text is to be printed on the next copy of the same film. Neither is there a risk of a printing block being dropped and lost. In particular, the fact that the printing blocks are manipulated individually and that a following printing block is not permitted to displace the preceding block affords improved reliability, particularly in view of the fact that it cannot always be guaranteed that the measurements of the blocks are precise and that the blocks are free of burrs.

The slide 61 is manouvered by means of a link 80 (FIG. 5) which is pivotally mounted in the slide at 81 and journalled to a crank at 82. The drive means herefor, referenced 6 in FIG. 1, is shown more clearly in FIG. 3, where the crank 83 is intended to be connected to the journal 82 (FIG. 5) on the link 80. A change of printing blocks takes place when the crank 83 is driven through one revolution. This is effected by rotation of the shaft 84, effected by means of a motor and a magnetic clutch (neither being shown) connected to the main shaft, the output shaft of said motor driving the shaft 84 via a torque-maximizing friction clutch 85, which has been included for reasons of safety. The shaft 84 drives a shaft 87 via a chain transmission, and the shaft 87, in turn, drives a bevel gear 88, the output shaft 89 of which has the crank 83 fitted thereto. In order to ensure that the crank 83 will always be rotated precisely through one revolution during a printing-block exchange sequence, the shaft 87 has fitted thereon a cam plate 90 having arranged therein a recess into which a spring-biased cam-follower 91 can be lowered so as to pull the shaft 87 to a "home position". The aforesaid magnetic clutch (not shown) is therewith disengaged immediately prior to reaching the home position, under the activation of a light fork acting on a perforated plate (not shown) mounted on the shaft 87.

Figure 3:
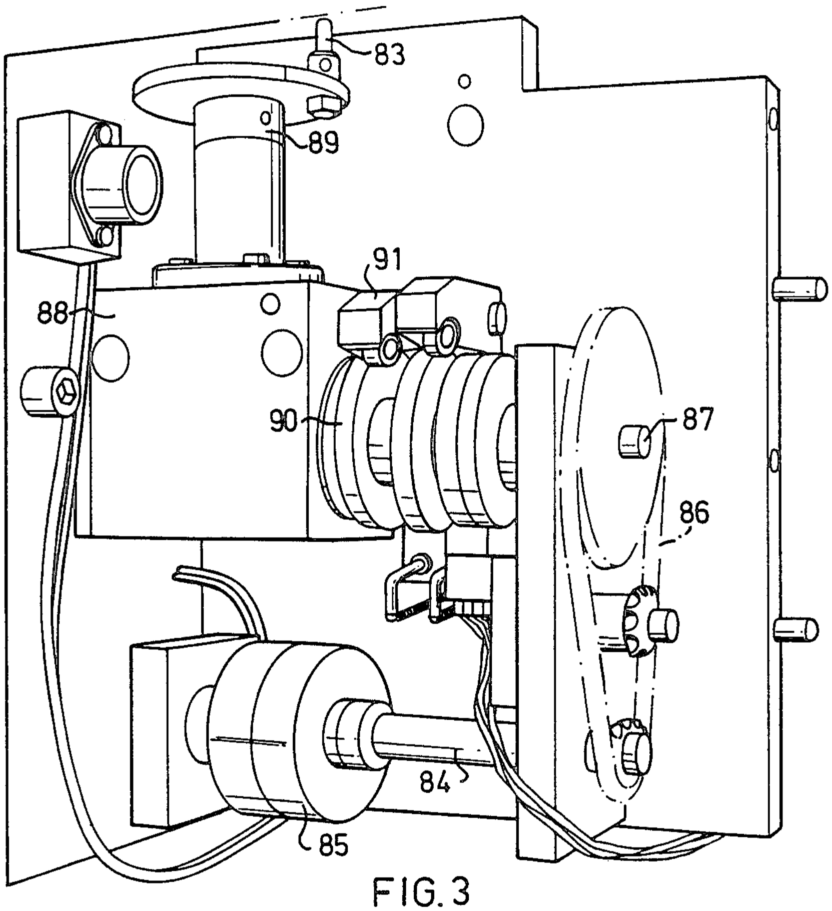
FIG. 3 illustrates the mechanism used to effect a change of printing blocks.

It will again be noted that the mechanism illustrated in FIG. 3 cannot be activated unless the pressure-generating mechanism is passive (detected through the microswitch 46 in FIG. 9). Neither can the mechanism for straightening the knee joint, illustrated in FIG. 9, be activated while the mechanism in FIG. 3 is in an active state.

The stroke-length of the knee-joint movement is 3 mm, and the length of stroke of the eccentric is also 3 mm. Consequently, when printing takes place, the pressure plate is located at a level which is 6 mm higher than the level occupied by the plate during a printing-block exchange sequence. When a printing-block sequence is initiated, by activation of the knee-joint movement, the printing-block exchange flap 62 receives the slide 32 from one side, wherewith the torque-limiting clutch 95 (FIG. 3) slips. If, instead, this movement of the knee joint were to be initiated with the flap 62 located in the printing-block position, it would not be possible to straighten the knee joint, thereby avoiding damage to the printing-block exchanging mechanism. Thus, there is provided a mechanical safety factor additional to the aforesaid electrical safety factor.

The various functions are driven by a common motor (not shown) and the whole can be said to be bound with the rotation of the main shaft 40, which is operative in causing the film to be advanced through a distance of one frame and optionally printing to take place with each full revolution. Printing cannot take place during a printingblock exchange sequence, which requires six full revolutions of the main shaft 40, although the film is still advanced.

The illustrated automatic printing machine has been found to function rapidly and well, and test runs have shown that it can be operated at a speed of 16 frames per second with faultless printing results. Thus, in principle, a standard feature film (90 minutes at 24 frames per second) can be provided with sub-titles in two and a quarter hours, plus the time taken to change the reels. The saving in time is thus quite considerable.

Although the automatic printer according to the invention can, in principle, be operated under constant supervision, the machine can also be controlled suitably with the aid of a data processor. In this case, the processor is programmed with information relating to those film frames which are to be printed upon by the printing blocks arranged in given order in the transport path and the values of the pressure forces to be used with each text, in dependence on the number of letters in each text. There is also provided at some suitable location a film-frame sensing device adapted to send to the data processor a signal for each film frame which passes, in response to which the data processor sends respective control signals to the printing unit and the printing-block changing mechanism. Since the invention does not relate to such a data-processor system per se, and since one skilled in this art will readily understand how such a system should be constructed to fulfill the various control functions required, no description of such a system will be given here.

I claim:

1. An automatic printing machine for printing text on cinematographic film, comprising a film transport path (8) having a film-feed means incorporating a gripping mechanism (4) for feeding the film intermittently frame by frame; a printing-block position located in the film transport path; a pressure plate (31), means for synchronized movement of the pressure plate with the gripping mechanism towards and away from the printing-block position for printing said text; a counter-pressure plate (16) mounted on the side of the film transport path (8) remote from the printing-block position; a pressure-generating means for producing a variable pressure force between the pressure plate (31) and the counter-pressure plate (16); a first printing-block transport path (10) intended for the supply of printing blocks and extending parallel with the film transport path (8) along one edge side thereof; insertion means (61, 62) for moving a printing block along a glide path from the first printing-block transport path (10) to the printing block position; and a second printing-block transport path (12) which also extends parallel with the film transport path and which receives a printing block displaced from the printing block position; wherein the insertion means (61, 62) includes a slide path which extends beneath the film transport path parallel with the glide path and which incorporates a slide (61) provided with a flap (62) which is journalled on a shaft (62A) extending parallel with the direction of the slide path, the flap being provided with a tooth (70) which is arranged to be moved into the glide path when the flap is swung to an activating position, and to displace a printing block (29) located in the printing block position when the slide executes a working movement along the glide path, said slide simultaneously displacing a printing block (29') located in the first printing-block transport path; and in that the flap (62) in its activating position covers the glide path from one side and prevents printing blocks from leaving said path; and means for manipulating the slide for reciprocating movement with the flap in its activating position, said means comprising a drive mechanism (6) which can only be activated when the means (5) for movement of the pressure plate (31) are in their passive mode.

2. An automatic printing machine according to claim 1, wherein the printing-block changing slide (61) is mechanically connected to a roofed, second slide (63) located in the second printing-block transport path opposite the printing-block position, such that when the first slide (61) is advanced to the printing-block position, the second slide (63) is retracted against the action of a spring and in the second printing-block transport path (12) exposes a vacant space which is covered by the roof of the second slide (63) and which receives the printing block (29) displaced from the printing-block position by the tooth (70) of the flap (62).

* * * * *